US011151730B2

United States Patent
Altuev et al.

(10) Patent No.: US 11,151,730 B2
(45) Date of Patent: Oct. 19, 2021

(54) SYSTEM AND METHOD FOR TRACKING MOVING OBJECTS

(71) Applicant: OOO ITV Group, Moscow (RU)

(72) Inventors: Murat Kazievich Altuev, Moscow (RU); Vadim Vladislavovich Shmelev, Moscow (RU); Egor Petrovich Suchkov, Tuapse (RU)

(73) Assignee: OOO ITV Group, Moscow (RU)

( * ) Notice: Subject to any disclaimer, the term of this patent is extended or adjusted under 35 U.S.C. 154(b) by 0 days.

(21) Appl. No.: 16/854,504

(22) Filed: Apr. 21, 2020

(65) Prior Publication Data

US 2020/0342613 A1      Oct. 29, 2020

(51) Int. Cl.
*H04N 5/225* (2006.01)
*H04N 7/18* (2006.01)
*G06T 7/292* (2017.01)
*H04N 5/232* (2006.01)

(52) U.S. Cl.
CPC ......... *G06T 7/292* (2017.01); *H04N 5/23216* (2013.01); *H04N 5/23299* (2018.08); *H04N 7/181* (2013.01); *G06T 2207/10016* (2013.01)

(58) Field of Classification Search
CPC .. H04N 17/002; H04N 7/181; H04N 5/23216; H04N 5/23299; G06T 7/292; G06T 2207/10016
USPC ....... 348/169, 135, 143, 146, 147, 148, 155, 348/156
See application file for complete search history.

(56) References Cited

U.S. PATENT DOCUMENTS

| | | | |
|---|---|---|---|
| 6,727,938 | B1 | 4/2004 | Randall |
| 2006/0203090 | A1* | 9/2006 | Wang ................. G08B 13/1963 348/143 |
| 2009/0167867 | A1 | 7/2009 | Lun-Chi et al. |
| 2019/0306408 | A1* | 10/2019 | Hofer ....................... G06T 7/80 |

FOREIGN PATENT DOCUMENTS

| | | |
|---|---|---|
| RU | 83675 U1 | 6/2009 |
| WO | 2012005387 A1 | 1/2012 |

\* cited by examiner

*Primary Examiner* — Robert Chevalier
(74) *Attorney, Agent, or Firm* — IRL Legal Services, LLC; Ilya R. Lapshin

(57) ABSTRACT

Processing and analysis of video data received from surveillance cameras, and more specifically detecting moving objects in the video and further tracking using a rotating video camera. A system for tracking moving objects comprises video cameras, a memory, a graphical user interface (GUI), and a data processing device. The GUI comprises a selection unit, a calibration unit, an operation mode selection unit, and a display unit. A method for tracking moving objects implemented by the computer system comprises the steps at which: the system is set up; the moving object is tracked by a video camera; video data from the video cameras are displayed simultaneously by the GUI display unit in different panes on the video camera layout screen in accordance with the selected system operation mode.

25 Claims, 2 Drawing Sheets

SYSTEM AND METHOD FOR TRACKING MOVING OBJECTS

RELATED APPLICATIONS

This application claims priority to Russian Patent Application No. RU 2019112139, filed Apr. 22, 2019, which is incorporated herein by reference in its entirety.

FIELD OF THE INVENTION

The invention pertains to the field of processing and analysis of video data received from surveillance cameras, and more specifically to technologies aimed at detecting moving objects in the video and their further tracking with the help of a rotating video camera.

BACKGROUND

Video surveillance systems are used to protect premises or territories. Typically, these systems use video multiple video cameras to monitor and track objects within a protected area. These video surveillance systems are based on image processing and image recognition algorithms that allow video analysis without direct human involvement.

Depending on specific purposes, video surveillance systems can perform many functions, such as: object detection, monitoring the object's movement, tracking moving objects, object identification, search for objects of interest, etc. These systems are quite straightforward and convenient.

In the process of territory monitoring, the operator often needs to zoom in the image in order to examine it in more detail, for example, a suspicious person and what he holds in his hands, or a registration number of the vehicle of interest. This can be particularly time consuming when the moving object is zoomed in, as it is constantly moving. In addition, while tracking the object of interest on several video surveillance cameras, the operator focuses all his attention on one object. In this case, there is a high probability of missing some violation (for example, illegal entry) in other places of the protected area.

Thus, the main disadvantages of prior art include lack of the ability to simultaneously display the full picture of the monitored territory and the detailed image of moving objects within it, as well as impossibility of tracking several moving objects using the received video data.

From the field of the invention, we know the solution disclosed in the International Patent Application Publication WO 2012/005387 A1 published Jan. 12, 2012, which describes the system and method for monitoring the moving object with the use of multiple cameras and the algorithm for tracking the object. The process and system for this invention contain a tracking system that manages multiple cameras, whereby multiple cameras track the subject, and a mobile communication system that delivers the traceable result of the tracking system to the user's mobile terminal. According to this invention, only the Y-signal from the image coming from the camera is detected and stored. Presence or absence of a moving object is verified by obtaining a difference image using the differences between the pixels of the current image and those of the previous image.

This technology provides a detailed algorithm for detecting the moving object, determining its motion direction, and further tracking of the moving object. Thus, this solution refers to detection of a single moving object, not all objects moving in the field of view of multiple surveillance cameras linked to a single rotating camera.

Technically, the closest solution is disclosed in the US Patent Application Publication 2009/0167867 A1 published Jul. 2, 2009, which describes a camera control system capable of positioning and tracking objects in space and comprising a location device for generation and transmission of a position signal according to its position in space; a receiver to receive the position signal transmitted by the location device; a control unit linked to the receiver to generate the control command according to the position signal received by the receiver; and a camera linked to the control unit, whereby the control command is used for changing the camera focus.

The main difference between the solutions known in the field of invention and the present solution is in the lack of description of a specific algorithm for setting up the video surveillance system to compare data from surveillance cameras and a rotating camera, as well as the lack of a specific interface of this video surveillance system which features specific units with functions for more convenient and efficient operation of the system. In addition, the known solutions do not imply simultaneous display of video data from the specified surveillance cameras and the linked rotating camera.

BRIEF SUMMARY

This technical solution is aimed to eliminate the disadvantages of the previous methods and to improve the existing solutions.

The technical result of the present group of inventions is detection and tracking by a rotating camera of objects moving in the frame of the surveillance camera.

This technical result is achieved by a system for tracking moving objects comprising: at least two video cameras, one of which is a pan-tilt-zoom (PTZ) video camera (PTZ camera) and at least one other video camera is a surveillance video camera; a memory capable of storing video data from all video cameras in the system; a graphical user interface (GUI) containing at least: a selection unit, a calibration unit, an operation mode selection unit, and a display unit; and a data processing device configured to execute the following steps:

setup of the system operation, which comprises providing the user with the ability to perform the following actions: (1) selection of specific surveillance cameras, from cameras available in the system, as the rotating video camera by a selection unit GUI; (2) calibration of each selected surveillance camera in relation to the rotating video camera using the calibration unit GUI, whereby the user sets not less than six links between the rotating camera and each surveillance camera during the calibration process; (3) selection of the system operation mode from the possible four operation modes using the operation mode selection unit GUI;

tracking of at least one moving object by a rotating video camera, whereby motion of all moving objects is detected in the frame of at least one surveillance video camera by the object tracker; and simultaneous display of video data from at least one surveillance camera and from the rotating camera in different panes on the video camera layout screen in accordance with the selected mode of the system operation using the display unit GUI.

This technical result is also achieved by the method of tracking the moving objects implemented by a computer system, which includes at least one data processing device, a memory, a graphical user interface (GUI), and at least two video cameras, wherein one of the cameras is a rotating video camera and at least one other camera is a surveillance camera, wherein the method comprises the steps at which the following operations are performed:

setup of the system operation, which comprises providing the user with the ability to perform the following actions: (1) selection of specific surveillance cameras, from cameras available in the system, as the rotating video camera via selection unit GUI; (2) calibration of each selected surveillance camera in relation to the rotating video camera using the calibration unit GUI, whereby the user sets not less than six links between the rotating camera and each surveillance camera during the calibration process; (3) selection of the system operation mode from the possible four operation modes using the operation mode selection unit GUI;

tracking of at least one moving object by a rotating video camera, whereby motion of all moving objects is detected in the frame of at least one surveillance video camera by the object tracker; and simultaneous display of video data from at least one surveillance camera and from the rotating camera in different panes on the video camera layout screen in accordance with the selected mode of the system operation using the display unit GUI.

In one particular embodiment, the object tracker detects all moving objects in the frame and determines their spatial coordinates.

In another particular embodiment, the system user performs the following actions using the GUI calibration unit during the calibration, when setting links between the rotating camera and each surveillance video camera: (a) selects one surveillance video camera from the list of previously selected video cameras in the system; (b) focuses the rotating video camera on any point in the view of the selected surveillance video camera; (c) sets the point on the frame of the selected surveillance camera that is currently facing the rotating camera; (d) repeats steps (b) and (c) at least six times to set at least six links; (e) repeats steps (a)-(d) for each next surveillance video camera of the system.

In another particular embodiment, the system is additionally configured to allow the system user to delete the points that were set by mistake using the calibration unit GUI.

In another particular embodiment, all points are set on the same spatial plane.

In another particular embodiment, one of the operation modes is the manual mode in which tracking by the rotating camera of at least one moving object in the frame of one of the surveillance cameras begins after the user of the system selects the tracked object in the frame of one of the surveillance cameras.

In another particular embodiment, one of the operation modes is the automatic mode in which tracking by the rotating camera of the moving objects is carried out automatically with a preset frequency of switching between all detected moving objects.

In another particular embodiment, one of the operating modes is the user priority mode in which the automatic mode is used by default, but the user can select a tracking object at any time and then activate the manual mode, wherein the automatic mode is activated again when the user deselects the tracked object or when the tracked object disappears from the surveillance area of the rotating camera.

In another particular embodiment, one of the operation modes is the manual PTZ camera control mode in which the automatic mode is used by default, but the user can take control of the rotating camera at any time.

In another particular embodiment, the moving object is a person or a vehicle.

In another particular embodiment, the tracking of the moving object is carried out using a mathematical transformation of the object's coordinates in the frame of the surveillance camera into the values of pan (p), tilt (t), and zoom (z) of the rotating camera using approximating smooth functions.

In another particular embodiment, the data processor is configured to automatically check for presence of a gap in at least one of the coordinates within the frame to allow the use of approximating smooth functions, wherein the check comprises the following steps: (a) searching for a specific location in the frame where the gap occurs; (b) restoration of the extreme value (max, min) of one of the p, t, z values through which the cyclic transition occurs at the gap location; (c) extension of the coordinates of at least one of the p, t, z values located on the other side of the gap to ensure continuity.

In another particular embodiment, when a gap is detected for one of the p, t, z, coordinates, it is converted back to the coordinates of the frame of the surveillance camera.

This technical result is also achieved using a computer-readable data carrier which contains instructions executed by the computer's processor for implementation of methods for tracking moving objects.

DETAILED DESCRIPTION

Description of the approximate embodiments is presented below. However, the inventions are not limited only to these embodiments. It will be obvious to persons who are experienced in this field that other embodiments may fall within the scope of the present group of inventions.

The invention in its various implementation options can be implemented in the form of computer systems and methods for tracking moving objects, as well as in the form of a computer-readable data carrier.

Figure 1:
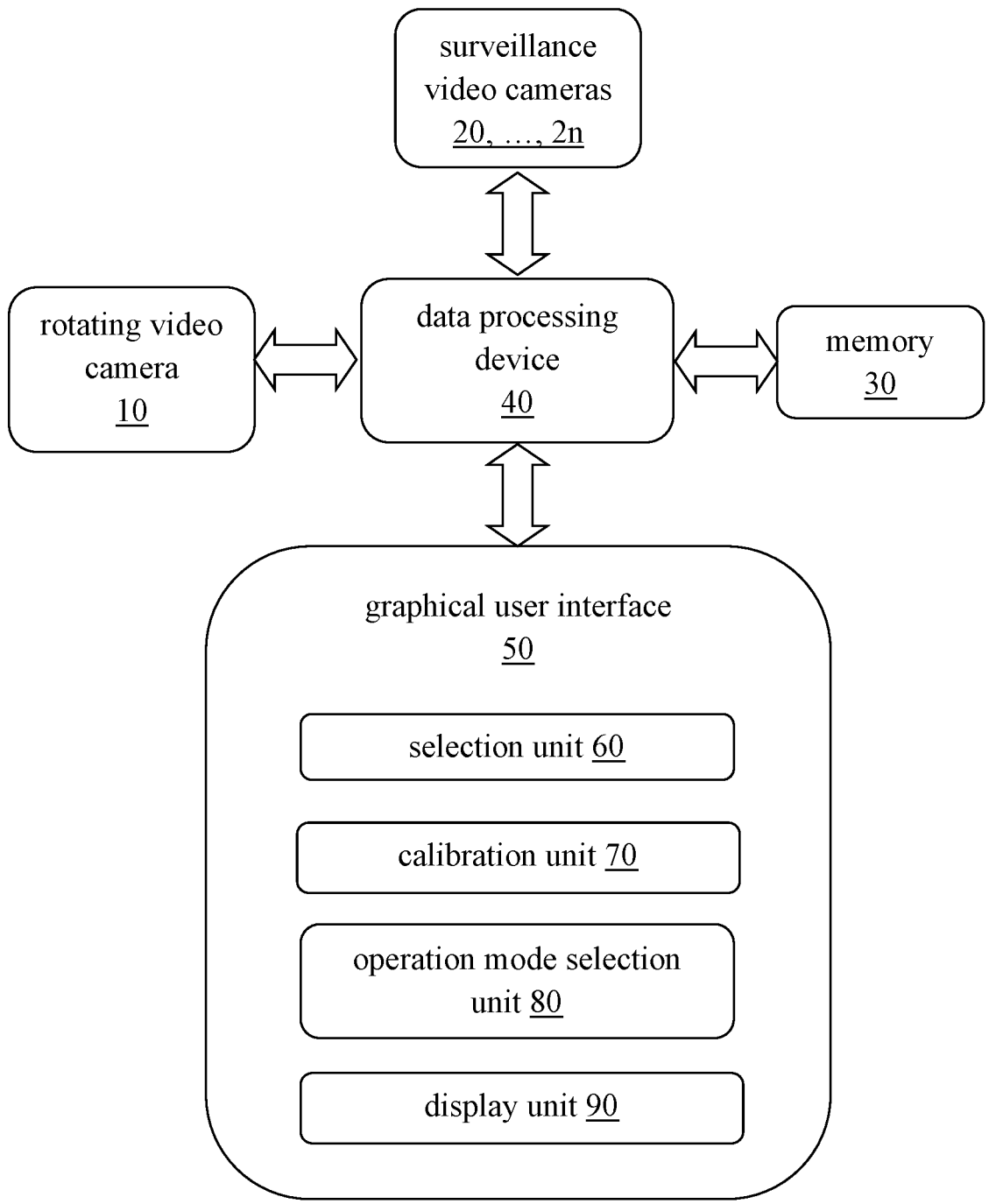
FIG. 1 is a flowchart of a system for tracking moving objects.

FIG. 1 shows a flowchart of an embodiment of a computer system for tracking moving objects. This system comprises: at least two video cameras, wherein one of them is a rotating video camera 10 and wherein at least one other video camera is a surveillance video camera 20, . . . , 2n; a memory 30; a data processing device 40; and a graphical user interface 50 which comprises at least the following: a selection unit 60, a calibration unit 70, a mode selection unit 80, and a display unit 90.

In the context of this application, computer systems are any systems based on hardware and software, such as: personal computers, smartphones, laptops, tablets, etc.

Memory devices may include, but are not limited to, hard disk drives (HDDs), flash memory, ROMs (read-only memory), solid state drives (SSDs), etc. In order to further understand the nature of the solutions, it is necessary to clarify that the system memory stores an archive of video data coming from all video cameras included in the security system.

The data processing device may be a processor, microprocessor, computer, PLC (programmable logic controller), or integrated circuit configured to execute certain commands (instructions, programs) for data processing. The processor can be multi-core, for parallel data processing.

The graphical user interface (GUI) is a system of tools for user interaction with the computing device based on displaying all system objects and functions available to the user in the form of graphical screen components (windows, icons, menus, buttons, lists, etc.). Thus, the user has random access via data input/output devices to all visible screen objects—interface units—which are displayed on the display/screen.

The data input/output device can be, but is not limited to, mouse, keyboard, touchpad, stylus, joystick, trackpad, etc.

It should be noted that this system may include any other devices known in the field of invention, such as input/output devices, graphics cards (including graphics processing units (GPUs)), various sensors, etc.

The following is an example of how the above system works to track the moving objects.

Let's consider a video surveillance system of a mall as an example. There are video surveillance cameras over the entire perimeter of each floor of the mall. The video cameras are located in such a way that their fields of view are slightly intersected/overlapped. This is necessary to ensure there are no blind areas of the video surveillance system and, if necessary, to create (restore) a full picture of the event based on the video data. Thus, each surveillance video camera is placed so as to face the plane in which the objects (floor, ground) move.

The object tracker is used in the present video surveillance system to detect moving objects on the video data from any video surveillance cameras. The object tracker is a software algorithm for determining the location of the moving objects in the video data. By using the tracker, it is possible to detect all moving objects in the frame and determine their specific spatial coordinates. In the context of this application, the movement of objects such as a person or a vehicle (car, bicycle, etc.) can be determined. These objects are usually of interest when analyzing the video data from surveillance cameras. It should be noted that all video surveillance cameras available in the system can use the object tracker.

As mentioned above, in addition to the video surveillance cameras, the present system for tracking the moving object comprises a rotating video camera with several surveillance cameras in its field of view. Correct interaction of all components included in the system and efficient operation of the system as a whole require performing a number of steps to configure the system before starting the operation. For this purpose, the system data processing device is configured to provide the system user with the ability to perform various configurations using the graphic user interface (GUI).

The first step in the setup process is (1) selection of specific video surveillance cameras from the cameras available in the system for a rotating camera. This step is performed by the system user using the selection unit GUI. The selection is done using a data input device, such as a computer mouse, for example. The user selects the surveillance cameras that fall within the field of view of the rotating camera and links them to this camera. The selection unit interface contains a selection box for a specific camera and an "add" button for adding a specific camera. Any number of surveillance cameras can be linked to the rotating camera. For example, let's assume that the user has selected 2 surveillance cameras out of 50 cameras located throughout the mall.

The second setup step is to calibrate each selected surveillance camera in relation to the rotating camera using the calibration unit GUI. During the calibration process, the user should specify at least six links between the rotating video camera and each surveillance video camera. The more links are specified, the more accurate the control of the rotating camera. Let's consider the calibration process in more detail.

At first, the system user selects one surveillance camera from the list of the system cameras selected at the first step. Then, the user focuses the rotating camera on a certain point in the field of view of the selected surveillance camera and specifies a point in the frame of the selected surveillance camera which is currently being watched by the focused rotating camera (for example, with the help of a computer mouse). To focus the rotating system on a certain point in the frame, the user changes the rotating camera lens orientation in the preview window of the calibration unit. This action is performed by remote control of the position. Then the user repeats the steps of focusing and pointing at least six times to set at least six links. It is recommended to set eight or more links. It should be noted that the points should be specified on one spatial plane (floor, ground).

To link the next surveillance camera to the rotating camera, the above steps should be repeated. These steps should be repeated for each of the remaining system surveillance cameras. It should be noted that, in order to improve the system operation, the observed objects should fit entirely in the frame of the rotating camera.

Once the calibration is done, the user can perform the recommended calibration check. To do this, the calibration unit GUI is equipped with a button, after pressing on which the user can click on different points in the surveillance camera frame. Thus, if the rotating camera is correctly positioned, it means that the calibration has been performed correctly, and if not, it is necessary to perform the calibration step anew to improve the system operation accuracy. In addition, the calibration unit GUI is equipped with tools to delete the points that were set by mistake. That is, it is not necessary to perform all calibration steps anew; the user can delete only those points that were set by mistake and replace them with the correct ones.

The final system setup step is selection of the system operation mode. Selection/control of the system is carried out by the system user using the operation mode selection unit GUI out of four possible operation modes (the manual mode, automatic mode, user priority mode and manual rotating camera control mode (PTZ)) the features of which will be discussed in detail below.

The manual mode is the most common and simple operation mode. In this mode, the rotating camera starts tracking a moving object in the frame of one of the surveillance cameras only after the user selects the tracked object on the frame of one of the surveillance cameras (by clicking using the computer mouse).

In the automatic mode, the rotating camera starts tracking the moving objects automatically. In this mode, the rotating camera focuses on each detected moving object at a time with a preset switching frequency between all detected moving objects. The switching frequency is set by the user in seconds using the GUI. This ensures consistent tracking of all moving objects in each of the available surveillance cameras (linked to the rotating camera).

The following two modes are different combinations of the standard modes described above. For example, in the user priority mode, if the user has not selected the tracking object in the manual mode, the automatic mode is used by default. However, in this mode, the user can select a tracked specific object at any time, which will activate the manual mode. Thus, when the user deselects the tracked object or when the object disappears from the surveillance area of the rotating camera, the automatic mode is activated again.

The manual rotating camera control mode (PTZ), like the user priority mode, is characterized by the fact that it uses the automatic mode by default. However, in this mode, the user can take over a specific remote control of the rotating video camera at any time without setting the moving object of interest.

Any of the modes is selected by the system user depending on the situation and the specific monitoring task. Once the appropriate system operation mode is selected, the operator clicks the Apply button in GUI. It should be noted that if the situation in the monitored area changes, the system user can always select any other system operation mode which is more appropriate.

Having performed all the steps required for the system operation, the user can start direct tracking of the moving objects. The data processing device of the present system is configured to perform tracking of at least one moving object by a rotating video camera under the above-mentioned settings. The tracking provides that once a moving object is detected in the field of view of one of the surveillance cameras, under the operation mode, the rotating video camera focuses on it, and thus the system operator sees the zoomed (enlarged) image of the moving object (for example, a walking person). In accordance with the changes of the coordinates of a person's position, the rotating video camera direction changes as well. This ensures that the person is constantly walking within the frame of the rotating video camera. Zooming in enables to see the person's face, features, or an object the person has in their hands. As mentioned above, the motion of all moving objects is detected in the frame of at least one surveillance video camera by using the object tracker. The tracking can be performed both for one selected moving object and for several moving objects simultaneously, by sequential switching between the detected moving objects.

The final step of the system operation is simultaneous display of video data from the selected surveillance cameras and from the rotating video camera in different panes on the video camera layout screen, in accordance with the selected system operation mode, on the display of GUI display unit. Thus, as mentioned earlier, video data coming in real time from all the surveillance cameras, as well as from the rotating camera are recorded in the archive (which is stored in the system memory) as separate video records. Storing the video data from the positioning system can be useful when investigating various alarm situations and incidents. It should be noted that simultaneous display of video data from the rotating camera and the surveillance cameras on the video camera layout screen enhances the overall efficiency of the system, because the operator can easily observe the general image of the territory and the detailed image of the moving objects at the same time. That is, in such a system, the user will not overlook important events, because all the data is displayed on the monitor.

In addition, the video data is analyzed in the process of loading it into memory to form metadata describing the data for all objects in the video. In this case, the metadata is detailed information about all objects moving in the field of view of each camera (motion trajectories, facial descriptors, recognized license plate numbers of cars, etc.). The obtained metadata is also stored in the system memory. Subsequently the obtained metadata is used for search purposes.

In addition, to simplify the investigation of various incidents, the system's data processing device is designed to offer the ability to perform video analysis of each of the received video images. Thus, the video analysis includes at least a search by metadata, such as: search for faces, search for vehicle registration numbers, search for moving objects, etc.

Let's consider the process of tracking the moving objects with a rotating video camera in more detail. The operation of the system for tracking the moving objects is carried out by mathematical transformation of coordinates of the object within the frame of the surveillance camera into the values of tilt (p), rotation (t), and scale (z) for the rotating camera using the approximating smooth functions, so that the rotating camera begins to follow (track) each moving object in real time. All three values of the rotating camera are linked to coordinates of the corresponding points on the frame as follows:

$$F_k(x,y)=a\times x^2+b\times y^2+c\times x\times y+d\times x+e\times y+g, \tag{1}$$

wherein k=1, 2, 3; $F_1$=p; $F_2$=t; $F_3$=Z.

This, the tilt value p of the video cameras can vary from minus 359 degrees to 0 or from 0 to 359 degrees. Therefore, the adjacent points of the frame will correspond to radically different tilt values of the rotating camera (for example, 0 and 359). In this case, the approximating smooth functions will not be applied in the mentioned mathematical transformation. For such a situation, there is a gap checking algorithm which automatically searches for the gap using two functions from different sides of the gap for approximation, so that all the calculations can be described by smooth functions, and the approximation is then performed correctly.

As for the specific implementation of the described algorithm, the system data processing device is configured to automatically check for a gap on one of the coordinates within the frame. The checking comprises three steps.

1. Searching for the gap location in the frame.

To detect the gap in one of p, t, z values the derivative of each of the values by the corresponding frame coordinate (for p—the derivative by x, for t—the derivative by y, for z—the derivative by z) is analyzed. Usually the rotating cameras have a gap only in the tilt value coordinate p.

2. Determining the extremum value (either the maximum (max) or the minimum (min)) of one of the p, t, z values through which the cyclic transition at the gap point occurs.

For example, to determine the maximum $p_{max}$ value it is necessary to consider all possible separations of the corresponding points into two groups: before the gap and after the gap (for example: 5 points before, 1 point after; 3 points before, 3 points after; etc.)

3. Extending the coordinates of one of the p, t, z values on the other side of the gap to ensure continuity.

The p coordinate on the other side of the gap is extended using the location of the gap and the extreme $p_{max}$ value.

After this transformation, it is possible to approximate the tilt p value using formula (1) for multiple points.

In addition, if a gap is detected in one of the p, t, z values, in some embodiments it may be transformed inversely into the coordinates of the surveillance video camera frame.

Let's consider implementations of the method for tracking the moving objects in more detail.

Figure 2:
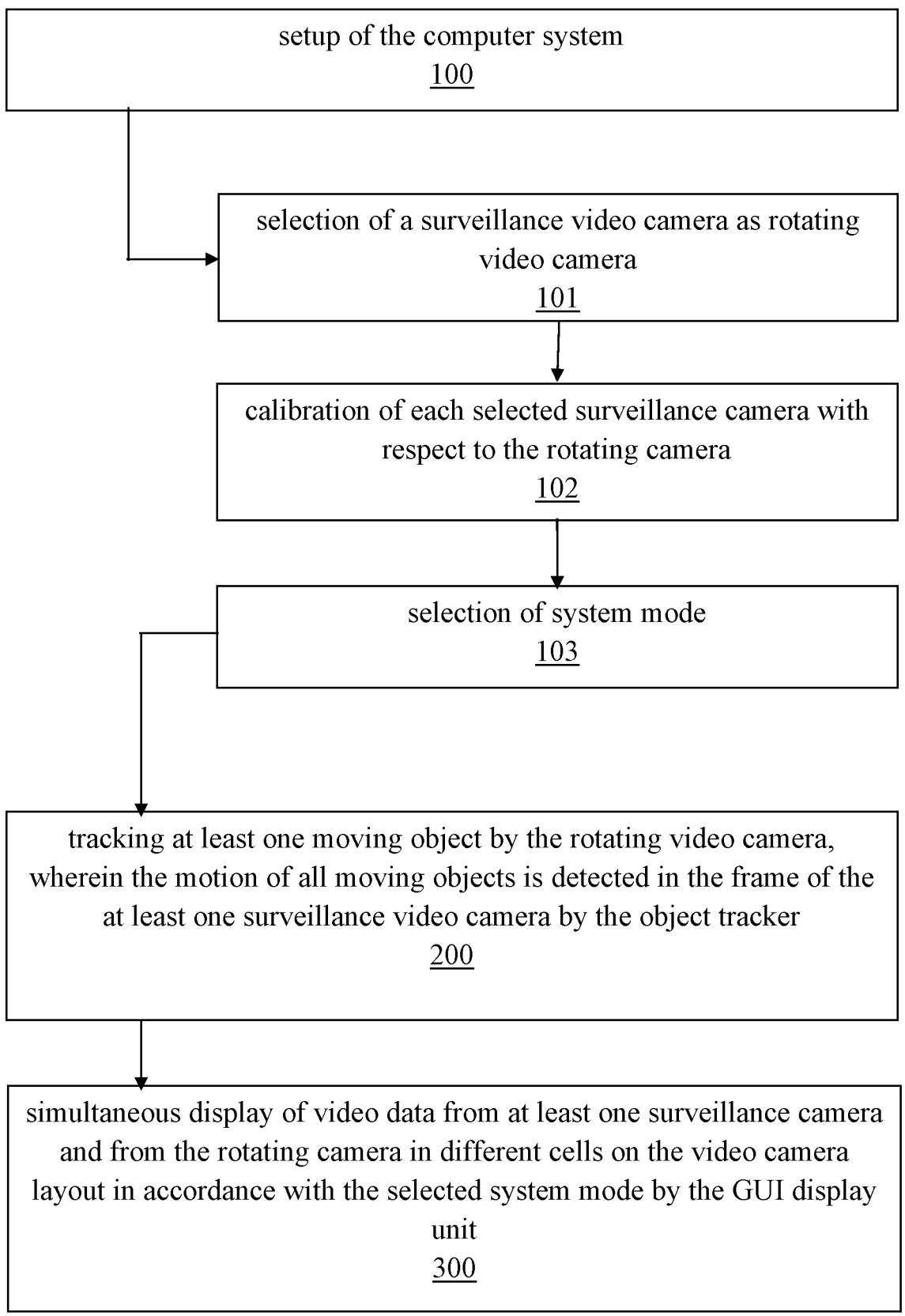
FIG. 2 is a flowchart of one embodiment of a method for tracking moving objects.

FIG. 2 shows a flowchart of one of the options for implementing the method for tracking the moving objects. This method is implemented by a computer system that includes at least the following components: a data processing device, a memory, a graphical user interface (GUI), and at least two video cameras. Thus, as mentioned above, one of the cameras is a rotating video camera and at least one other camera is a surveillance video camera comprising an object tracker.

Thus, the method comprises the steps at which the following operations are preformed:

100—the setup of the system to enable the user to perform the following actions:

101—the selection of specific surveillance video cameras from the cameras available in the system as rotating video cameras using the selection unit GUI;

102—calibration of each selected surveillance camera in relation to the rotating camera using the calibration unit GUI, whereby the user sets at least six links between the rotating camera and each surveillance camera during the calibration process;

103—selection of the system operation mode out of four possible operation modes using the operation mode selection unit GUI;

200—tracking of at least one moving object by the rotating video camera, whereby the motion of all moving objects is detected in the frame of at least one surveillance video camera by the object tracker;

300—simultaneous display of video data from at least one surveillance camera and from a rotating camera in different panes on the video camera layout screen in accordance with the selected mode of the system operation using the display unit GUI.

It should be noted once again that this technique is implemented using the previously described computer system for tracking the moving objects and, therefore, can be expanded and refined by all particular embodiments that have been already described above for embodiment of the system for tracking the moving objects.

Besides, the embodiment options of this group of inventions can be implemented with the use of software, hardware, software logic, or their combination. In this embodiment example, software logic, software, or a set of instructions are stored on one or multiple various conventional computer-readable data carriers.

In the context of this description, a "computer-readable data carrier" may be any environment or medium that can contain, store, transmit, distribute, or transport the instructions (commands) for their application (execution) by a computer device, such as a personal computer. Thus, a data carrier may be an energy-dependent or energy-independent machine-readable data carrier.

If necessary, at least some part of the various operations presented in the description of this solution can be performed in an order differing from the described one and/or simultaneously with each other.

Although the technical solution has been described in detail to illustrate the most currently required and preferred embodiments, it should be understood that the invention is not limited to the embodiments disclosed and, moreover, is intended to modify and combine various other features of the embodiments described. For example, it should be understood that this invention implies that, to the possible extent, one or more features of any embodiment may be combined with one or more other features of any other embodiment.

The invention claimed is:

1. A system for tracking the moving objects which comprises:
   at least two cameras, one of which is a pan-tilt-zoom video camera (PTZ) and at least another is a surveillance video camera;
   memory made with the ability to store video data coming from these video cameras;
   a graphical user interface (GUI) containing at least the following: a selection block, a calibration block, an operation mode selection block, and a display block;
   a data processing device configured with the ability to perform the following steps:
      setup of the system operation, which comprises in providing the system user with the ability to perform the following actions:
         (1) selection of specific surveillance video cameras from the cameras available in the system for PTZ video camera by means of the GUI selection block;
         (2) calibration of each selected surveillance camera in relation to the rotating camera by means of the GUI calibration block, whereby the user sets at least six connections between the rotating camera and each surveillance camera during the calibration process;
         (3) selection of the system operation mode out of four possible operation modes by means of the GUI operation mode selection block;
      tracking of at least one moving object by a rotating video camera, whereby motion of all moving objects is detected in the frame of at least one surveillance video camera by the object tracker;
      simultaneous display of video data from at least one surveillance camera and from a rotating camera in different panes on the video camera layout in accordance with the selected mode of the system operation by means of the GUI display block;
      wherein the object tracker detects all moving objects in the frame and determines their spatial coordinates.

2. The system according to claim 1, wherein the system user performs the following actions by means of the GUI calibration block during the calibration, when setting connections between the rotating camera and each surveillance video camera:
   (a) selects one surveillance video camera from a list of previously selected video cameras in the system;
   (b) focuses the rotating video camera on any point in the field of view of the selected surveillance video camera;
   (c) sets a point on the frame of the selected surveillance video camera that is currently faced by the rotating camera;
   (d) repeats actions (b) and (c) at least six times to set at least six connections;
   (e) repeats actions (s)—(d) for each next surveillance video camera of the system.

3. The system according to claim 2, which is additionally configured to allow the system user to delete the points which were set by mistake by means of the GUI calibration block.

4. The system according to claim 2, wherein all mentioned points are set on one spatial plane only.

5. The system according to claim 1, wherein one of the operation modes is the "manual mode" in which tracking for at least one moving object by rotating camera in the frame of one of the surveillance cameras begins after the user of the system selects the tracking object on the frame of one of the surveillance cameras.

6. A system for tracking the moving objects which comprises:
   at least two cameras, one of which is a pan-tilt-zoom video camera (PTZ) and at least another is a surveillance video camera;
   memory made with the ability to store video data coming from these video cameras;

a graphical user interface (GUI) containing at least the following: a selection block, a calibration block, an operation mode selection block, and a display block;

a data processing device configured with the ability to perform the following steps:

setup of the system operation, which comprises in providing the system user with the ability to perform the following actions:

(1) selection of specific surveillance video cameras from the cameras available in the system for PTZ video camera by means of the GUI selection block;

(2) calibration of each selected surveillance camera in relation to the rotating camera by means of the GUI calibration block, whereby the user sets at least six connections between the rotating camera and each surveillance camera during the calibration process;

(3) selection of the system operation mode out of four possible operation modes by means of the GUI operation mode selection block;

tracking of at least one moving object by a rotating video camera, whereby motion of all moving objects is detected in the frame of at least one surveillance video camera by the object tracker;

simultaneous display of video data from at least one surveillance camera and from a rotating camera in different panes on the video camera layout in accordance with the selected mode of the system operation by means of the GUI display block;

wherein one of the operation modes is "automatic mode" in which tracking of the moving objects is carried out by rotating camera automatically, with a preset frequency of switching between all detected moving objects.

7. The system according to claim 1, wherein one of the operating modes is a "user priority mode" in which the default "automatic mode" is used, but the user can select the tracking object at any time, and then activate the "manual mode", whereby when the user deselects the tracking object or when it disappears from the surveillance area of the rotating camera, the "automatic mode" is activated again.

8. The system according to claim 1, wherein one of the operation modes is a "manual rotating camera control mode (PTZ)" in which the "automatic mode" is used by default, but the user can take control of the rotating camera at any time.

9. The system according to claim 1, wherein the moving object is a person or a vehicle.

10. The system according to claim 1, wherein tracking of the moving object is carried out by mathematical transformation of the object coordinates in the frame of the surveillance camera into the values of pan (p), tilt (t), and zoom (z) of the rotating camera by using approximating smooth functions.

11. The system according to claim 10, wherein the data processor is configured to automatically check for presence of a gap in one of the mentioned coordinates within the frame to allow the use of the approximating smooth functions, whereby the mentioned check contains the following steps:

(a) search for a specific place of the gap in the frame;
(b) extreme value (max, min) recovery of one of the p, t, and z values through which the cyclic transition at the gap point occurs;
(c) extension of coordinates of one of the p, t, z values on the other side of the gap to ensure continuity.

12. The system according to claim 11, wherein when a gap is detected on one of the p, t, z, values, it is converted back to coordinates of the frame of the surveillance camera.

13. A method for tracking the moving objects implemented by the computer system, which includes at least one data processing device, a memory, a graphical user interface (GUI), and at least two video cameras, whereby one of them is a rotating video camera and at least one more camera is a surveillance camera, whereby the method contains the stages at which the following operations are performed:

setup of the system to enable the user to perform the following actions:

(1) selection of specific surveillance video cameras from the cameras available in the system for rotating video camera by means of the GUI selection block;

(2) calibration of each selected surveillance camera in relation to the rotating camera by means of the GUI calibration block, whereby the user sets at least six connections between the rotating camera and each surveillance camera during the calibration process;

(3) selection of the system operation mode out of four possible operation modes by means of the GUI operation mode selection block;

tracking of at least one moving object by a rotating video camera, whereby motion of all moving objects is detected in the frame of at least one surveillance video camera by the object tracker;

simultaneous display of video data from at least one surveillance camera and from a rotating camera in different panes on the video camera layout in accordance with the selected system operation mode by means of the GUI display block, wherein the object tracker detects all moving objects in the frame and determines their spatial coordinates.

14. The method according to claim 13, wherein the system user performs the following actions by means of the GUI calibration block during the calibration, when setting connections between the rotating camera and each surveillance video camera:

(a) selects one surveillance video camera from a list of previously selected video cameras in the system;
(b) focuses the rotating video camera on any point in the field of view of the selected surveillance video camera;
(c) sets a point on the frame of the selected surveillance video camera that is currently faced by the rotating camera;
(d) repeats actions (b) and (c) at least six times to set at least six connections;
(e) repeats actions (s)—(d) for each next surveillance video camera of the system.

15. The method according to claim 14, wherein the system user is additionally provided with the ability to delete the points that were set by mistake using the GUI calibration block.

16. The method according to claim 14, wherein all mentioned points are set on one spatial plane only.

17. The method according to claim 13, wherein one of the operation modes is the "manual mode" in which tracking for at least one moving object by rotating camera in the frame of one of the surveillance cameras begins after the user of the system selects the tracking object on the frame of one of the surveillance cameras.

18. The method according to claim 13, wherein one of the operation modes is "automatic mode" in which tracking of the moving objects is carried out by rotating camera automatically, with a preset frequency of switching between all detected moving objects.

19. The method according to claim 13, wherein one of the operating modes is a "user priority mode" in which the default "automatic mode" is used, but the user can select the tracking object at any time, and then activate a "manual mode", whereby when the user deselects the tracking object or when it disappears from the surveillance area of the rotating camera, the "automatic mode" is activated again.

20. The method according to claim 13, wherein one of the operation modes is a "manual rotating camera control mode (PTZ)" in which the "automatic mode" is used by default, but the user can take control of the rotating camera at any time.

21. The method according to claim 13, wherein the moving object is a person or a vehicle.

22. The method according to claim 13, wherein tracking of the moving object is carried out by mathematical transformation of the object coordinates in the frame of the surveillance camera into the values of pan (p), tilt (t), and zoom (z) of the rotating camera by using approximating smooth functions.

23. The method according to claim 22, which offers the ability to automatically check for presence of a gap in one of the mentioned coordinates within the frame to allow the use of the approximating smooth functions, whereby the mentioned check contains the following steps:
(f) search for a specific place of the gap in the frame;
(g) extreme value (max, min) recovery of one of the p, t, and z values through which the cyclic transition at the gap point occurs;
(h) extension of coordinates of one of the p, t, z values on the other side of the gap to ensure continuity.

24. The method according to claim 23, wherein when a gap is detected on one of the p, t, z, values, it is converted back to coordinates of the frame of the surveillance camera.

25. Non-transitory computer readable data carrier that contains instructions executed by the computer processor for implementing the methods for tracking the moving objects according to claim 13.

* * * * *